US012160087B1

(12) United States Patent
Gozawa

(10) Patent No.: US 12,160,087 B1
(45) Date of Patent: Dec. 3, 2024

(54) SPARK PLUG

(71) Applicant: Niterra Co., Ltd., Nagoya (JP)

(72) Inventor: Tatsuya Gozawa, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/669,682

(22) Filed: May 21, 2024

(30) Foreign Application Priority Data

May 22, 2023 (JP) ................................ 2023-083617

(51) Int. Cl.
*H01T 13/16* (2006.01)
*H01T 13/34* (2006.01)

(52) U.S. Cl.
CPC ............ *H01T 13/16* (2013.01); *H01T 13/34* (2013.01)

(58) Field of Classification Search
CPC .......... H01T 13/16; H01T 13/20; H01T 13/34
USPC .......................................................... 313/141
See application file for complete search history.

(56) References Cited

U.S. PATENT DOCUMENTS 10,756,517 B1 * 8/2020 Kawamura ............. H01T 13/20
10,770,868 B1 * 9/2020 Gozawa .................. H01T 13/20
2020/0287358 A1 * 9/2020 Gozawa .................. H01T 13/16
2020/0295540 A1 * 9/2020 Ban ......................... H01T 13/54
2022/0360051 A1 * 11/2022 Ban ......................... H01T 13/08
2023/0143447 A1 * 5/2023 Gozawa .................. H01T 13/32
313/142
2024/0243557 A1 * 7/2024 Kikai ...................... H01T 13/16

FOREIGN PATENT DOCUMENTS

JP 2020-145018 A 9/2020

* cited by examiner

*Primary Examiner* — Christopher M Raabe
(74) *Attorney, Agent, or Firm* — KUSNER & JAFFE

(57) ABSTRACT

A spark plug includes: a center electrode; a metal shell that holds the center electrode in an insulated manner; and a rod-like ground electrode electrically connected to the metal shell and having one end opposed to the center electrode. The metal shell includes a tubular distal end portion inside which the one end of the ground electrode is located. The distal end portion has a hole into which the other end of the ground electrode is inserted. A value obtained by dividing a surface area of a portion of the ground electrode, the portion being located on an inner circumferential side of the distal end portion, by a side surface area of a portion of the ground electrode, the portion being located inside the hole, is less than or equal to 13.1.

3 Claims, 3 Drawing Sheets

SPARK PLUG

FIELD OF THE INVENTION

The present invention relates to a spark plug in which a ground electrode is connected to a metal shell.

BACKGROUND OF THE INVENTION

Japanese Unexamined Patent Application Publication No. 2020-145018 discloses a spark plug including a center electrode, a metal shell that holds the center electrode in an insulated manner, and a ground electrode connected to the metal shell. In the spark plug, the ground electrode is disposed in a hole provided in a tubular distal end portion of the metal shell.

In the spark plug disclosed therein, the ground electrode surrounded by the distal end portion is hardly cooled by fuel or intake charge mixture. Hence, the overheated ground electrode may serve as an ignition source and cause pre-ignition.

The present invention has been made to solve this problem, and an object thereof is to provide a spark plug capable of reducing the occurrence of pre-ignition.

SUMMARY OF THE INVENTION

In order to achieve the object, according to an aspect of the present invention, there is provided a spark plug including: a center electrode; a metal shell that holds the center electrode in an insulated manner; and a rod-like ground electrode electrically connected to the metal shell and having one end opposed to the center electrode. The metal shell includes a tubular distal end portion inside which the one end of the ground electrode is located. The distal end portion has a hole into which the other end of the ground electrode is inserted. A value obtained by dividing a surface area of a portion of the ground electrode, the portion being located on an inner circumferential side of the distal end portion, by a side surface area of a portion of the ground electrode, the portion being located inside the hole, is less than or equal to 13.1. The value is preferably less than or equal to 6.0 and, more preferably, is less than or equal to 5.5.

According to the present invention, the value obtained by dividing the surface area of the portion of the ground electrode located on the inner circumferential side of the distal end portion, i.e., the portion subjected to the heat of the combustion gas, by the side surface area of the portion of the ground electrode located inside the hole, i.e., the portion via which the heat is released to the metal shell, is less than or equal to 13.1. Hence, it is possible to prevent overheating of the ground electrode, and thus to reduce the occurrence of pre-ignition.

DETAILED DESCRIPTION OF THE INVENTION

Figure 1:
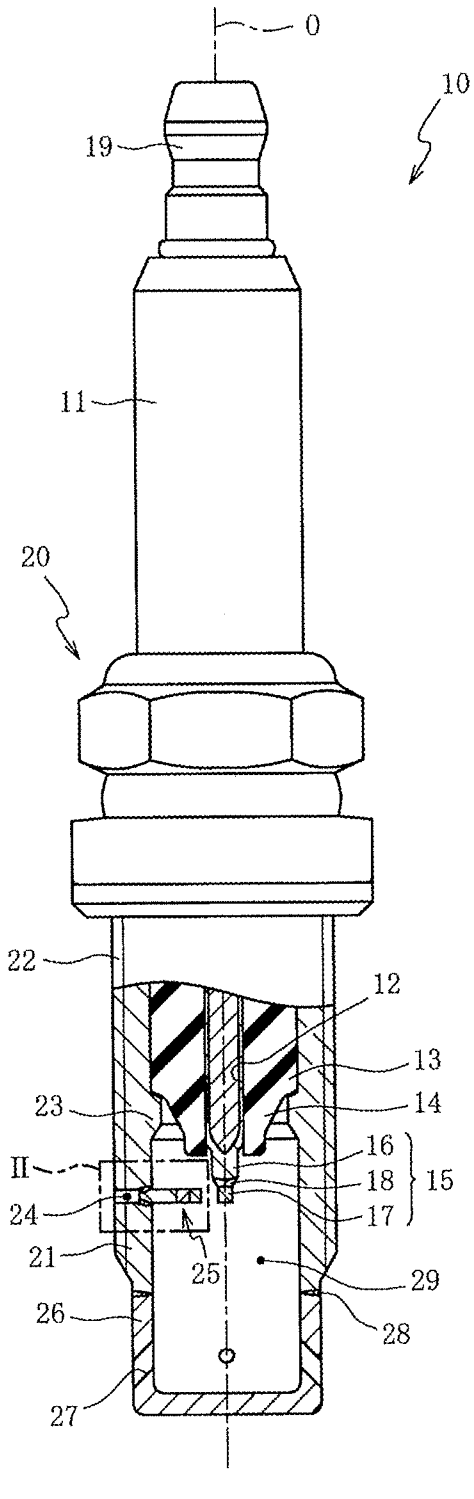
FIG. 1 is a partial sectional view of a spark plug according to a first embodiment.

Hereinbelow, preferred embodiments of the present invention will be described with reference to the accompanying drawings. FIG. 1 is a partial sectional view of a spark plug 10 according to a first embodiment. FIG. 1 shows a cross section, including an axial line O, of a distal-side portion of the spark plug 10. In FIG. 1, the lower side of the drawing corresponds to the distal side of the spark plug 10, and the upper side of the drawing corresponds to the proximal side of the spark plug 10 (the same applies to FIGS. 2 and 3). As shown in FIG. 1, the spark plug 10 includes an insulator 11, a center electrode 15, a metal shell 20, and a ground electrode 25.

The insulator 11 is a substantially cylindrical member having an axial hole 12 extending along the axial line O. The insulator 11 is formed of ceramics, such as alumina, which is excellent in mechanical characteristics and insulation properties at high temperatures. The insulator 11 includes an engaging portion 13 and an end portion 14 adjacent to the distal side of the engaging portion 13. The outer diameter of the end portion 14 is smaller than that of the engaging portion 13.

The center electrode 15 is disposed in the axial hole 12, along the axial line O, so as to extend at least from the engaging portion 13 to the end portion 14 of the insulator 11. The center electrode 15 includes a rod-like base material 16 mainly composed of Ni, a tip 17 disposed at the distal end of the base material 16 and mainly composed of at least one of noble metals, such as Pt, Rh, Ru, and Ir, and a fused portion 18 that joins the tip 17 and the base material 16 to each other. The tip 17 and the fused portion 18 may be omitted.

The distal end of the center electrode 15 protrudes from the insulator 11 toward the distal side. The center electrode 15 is electrically connected to a metal terminal 19 inside the axial hole 12. The metal terminal 19 is a rod-like member to which an ignition system (not shown) is connected, and is formed of a conductive metal material (for example, low-carbon steel). The metal terminal 19 is fixed to the proximal end of the insulator 11.

The metal shell 20 is a substantially cylindrical member formed of a conductive metal material (for example, copper, a copper alloy, or low-carbon steel). The metal shell 20 is disposed on the outer circumference of the insulator 11. The metal shell 20 includes a cylindrical distal end portion 21 located on the outer circumferential side of at least the engaging portion 13 and the end portion 14 of the insulator 11. The distal end portion 21 has a male thread 22 on the outer circumference thereof and a step portion 23 on the inner circumference thereof. The male thread 22 is fitted into a female thread provided in a plug hole of an engine (not shown). The step portion 23 is located to the distal side of the engaging portion 13 of the insulator 11 to catch the engaging portion 13. The distal end portion 21 extends further toward the distal side than the end portion 14 of the insulator 11.

The distal end portion 21 has a hole 24, which is a recess provided in a part of the inner circumference of the distal end portion 21, at a portion closer to the distal end than the step portion 23. In this embodiment, the hole 24 has a circular cross section and radially penetrates through the distal end portion 21. The presence of the hole 24 makes a void in a part of the male thread 22. A part of the ground electrode 25 is disposed in the hole 24. The ground electrode 25 partially disposed in the hole 24 protrudes from the distal end portion 21 toward the center electrode 15.

A cap 26 closing the distal end of the metal shell 20 creates a space 29 inside the cap 26. The cap 26 is made of, for example, a metal material mainly composed of at least one of Fe, Ni, Cu, and the like. In this embodiment, the cap 26 is connected to the distal end of the distal end portion 21 via a fused portion 28. The cap 26 has through holes 27 communicating between the inside and the outside of the space 29.

Figure 2:
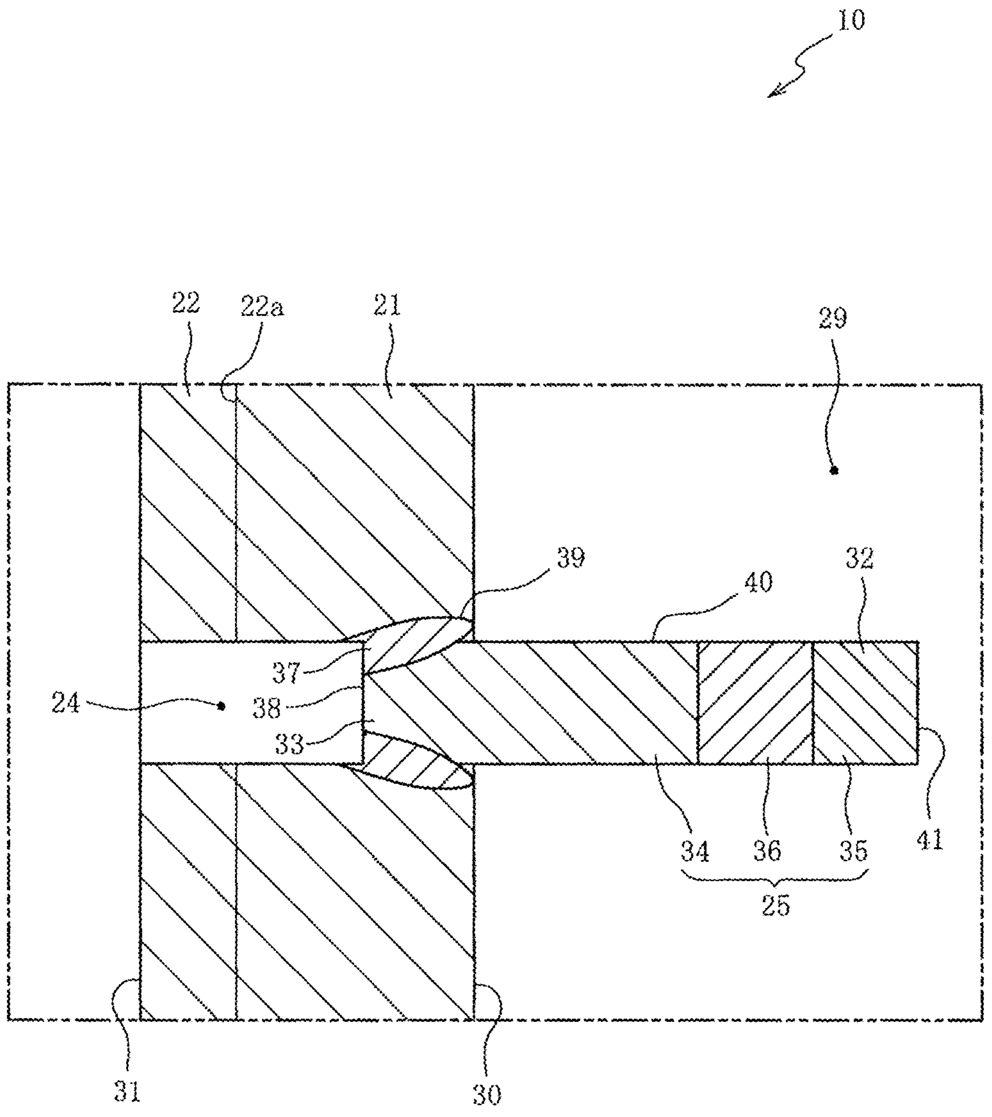
FIG. 2 is an enlarged sectional view of a portion II of the spark plug in FIG. 1.

FIG. 2 is an enlarged sectional view of a portion II of the spark plug 10 in FIG. 1. The ground electrode 25 is rod-shaped, and has one end 32 opposed to the center electrode 15 (see FIG. 1) to form a spark gap therebetween and the other end 33 disposed in the hole 24. The one end 32 is located inside an inner circumference 30 of the distal end portion 21. The one end 32 is cylindrical and has a circular cross section. The other end 33 is located inside an outer circumference 31 of the distal end portion 21, and inside a root 22*a* of the male thread 22. The other end 33 is cylindrical and has a circular cross section to fit into the hole 24. The hole 24 penetrating through the distal end portion 21 is closed by the other end 33.

The ground electrode 25 includes a base material 34 mainly composed of, for example, Ni, a tip 35 mainly composed of at least one of noble metals, such as Pt, Rh, Ru, and Ir, and a fused portion 36 that joins the tip 35 and the base material 34 to each other. The one end 32 of the ground electrode 25 includes a part of the tip 35, and the other end 33 includes a part of the base material 34. The tip 35 and the fused portion 36 may be omitted.

The ground electrode 25 is connected to the distal end portion 21 via a fused portion 37 in the hole 24. The fused portion 37 is formed by irradiating a bottom surface 38 of the ground electrode 25 disposed in the hole 24 with a laser beam. The fused portion 37 is a portion in which a portion including part of the bottom surface 38 of the ground electrode 25 and a portion including part of the distal end portion 21 are fused together. In this embodiment, the fused portion 37 is continuous over the entire circumference of the bottom surface 38 of the ground electrode 25, and the radially inner end of the fused portion 37 reaches the inner circumference 30 of the distal end portion 21.

The heat of the ground electrode 25 is transmitted to the distal end portion 21 through an interface 39 between the fused portion 37 and the distal end portion 21. As a result, the ground electrode 25 is cooled. The amount of heat transferred greatly depends on the area of the interface 39. The fused portion 37 is a part of the ground electrode 25. A side surface 40 and a bottom surface 41 of a portion of the ground electrode 25 located inside the inner circumference 30 of the distal end portion 21 (i.e., the portion located inside the space 29) are heat-receiving surfaces that receive heat generated by combustion of the fuel in the space 29.

In the spark plug 10 (see FIG. 1) installed in an engine (not shown), when the valve of the engine is operated, the fuel flows into the space 29 from the combustion chamber of the engine through the through holes 27. The spark plug 10 generates a flame kernel by using discharge between the center electrode 15 and the ground electrode 25. When the flame kernel grows, the fuel in the space 29 is ignited and combusted. Expansion pressure generated by the combustion of fuel generates a flow of gas containing flame, and the gas containing flame is injected into the combustion chamber from the through holes 27. The fuel in the combustion chamber is combusted by the jet of the flame. That is, the space 29 inside the cap 26 serves as an auxiliary combustion chamber provided inside the combustion chamber of the engine.

The spark plug 10 is configured to have a value S/E of less than or equal to 13.1, where S/E is a value obtained by dividing a total surface area, S, of the side surface 40 and the bottom surface 41 of the portion of the ground electrode 25 located inside the inner circumference 30 of the distal end portion 21 by a side surface area, E, of the portion of the ground electrode 25 located inside the hole 24 (in this embodiment, the area of the interface 39). This is to balance between the heat received by the ground electrode 25 and the heat transferred from the ground electrode 25 to the distal end portion 21 to prevent overheating of the ground electrode 25 and reduce the occurrence of pre-ignition. The value S/E is preferably less than or equal to 6.0 and, more preferably, is less than or equal to 5.5.

In the spark plug 10, the portion of the ground electrode 25 located on the inner circumference 30 side of the distal end portion 21 is covered with the cap 26. Because the space 29 on the inner circumference 30 side of the distal end portion 21 communicates with the combustion chamber (not shown) through the through holes 27 in the cap 26, the ground electrode 25 is hardly cooled by the fuel or the intake charge mixture supplied to the combustion chamber. Thus, the ground electrode 25 tends to be overheated. However, because the value S/E of the spark plug 10 is set to less than or equal to 13.1, it is possible to prevent overheating of the ground electrode 25 and to reduce the occurrence of pre-ignition. Therefore, the invention is suitable for the spark plug 10 having the cap 26.

A second embodiment will be described with reference to FIG. 3. In the first embodiment, the case where the fused portion 37 is continuous over the entire circumference of the bottom surface 38 of the ground electrode 25, and the fused portion 37 reaches the inner circumference 30 of the distal end portion 21 has been described. In the second embodiment, a case where an intermittent fused portion 59 is provided along the edge of a bottom surface 60 of a ground electrode 53, and the fused portion 59 do not reach the inner circumference 30 of the distal end portion 21 will be described. In the second embodiment, the same reference numerals denote the same parts as those described in the first embodiment, and detailed descriptions thereof will be omitted.

Figure 3:
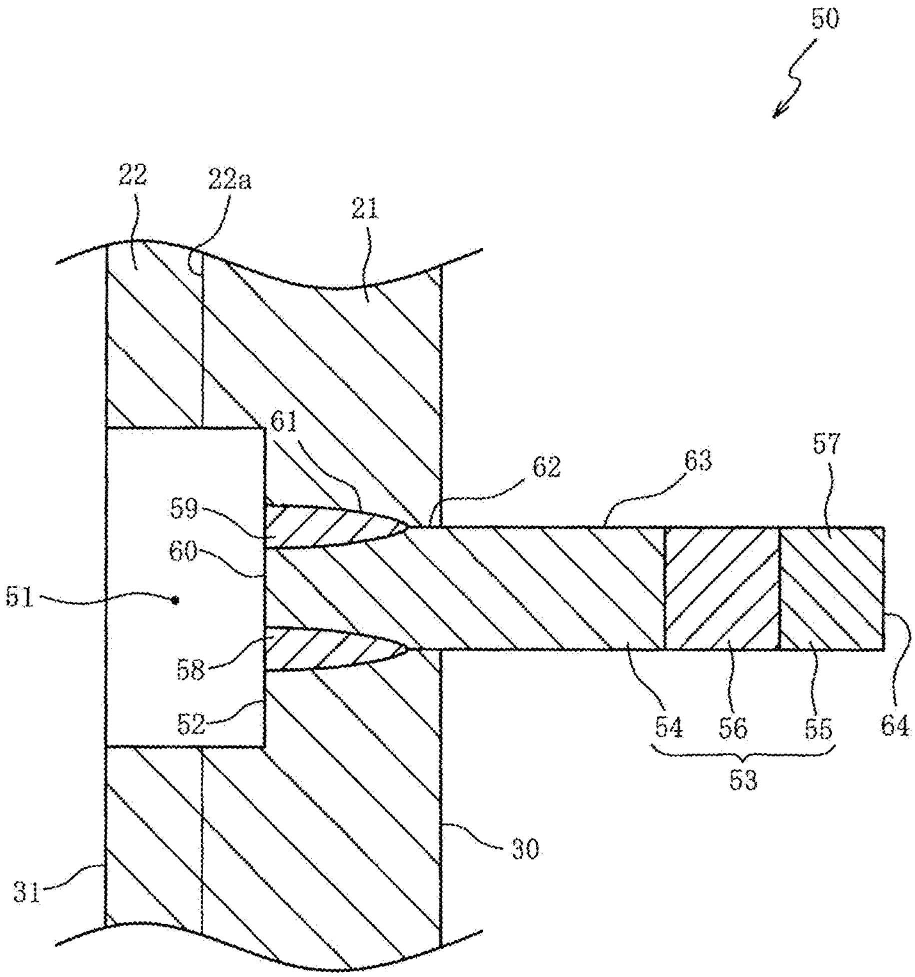
FIG. 3 is a sectional view of a spark plug according to a second embodiment.

FIG. 3 is a sectional view of a spark plug 50 according to the second embodiment. FIG. 3 is an enlarged view of a hole 51 provided in the distal end portion 21 of the metal shell 20 and the vicinity thereof. FIG. 3 does not show other parts. A part of the inner circumference 30 of the distal end portion 21 is recessed due to the presence of the hole 51. In this embodiment, the hole 51, which has a circular cross section, radially penetrates through the distal end portion 21. The hole 51 is provided with a counterbore 52 in the outer circumference 31 of the distal end portion 21. The counterbore 52 is located on a further inner side than the root 22*a* of the male thread 22.

The ground electrode 53 includes a base material 54 mainly composed of, for example, Ni, a tip 55 mainly composed of at least one of noble metals, such as Pt, Rh, Ru, and Ir, and a fused portion 56 that joins the tip 55 and the base material 54 to each other. The ground electrode 53 is rod-shaped and has one end 57 opposed to the center electrode 15 (see FIG. 1) to form a spark gap therebetween, and the other end 58 disposed in the hole 51.

The one end 57 is cylindrical and has a circular cross section. The other end 58 is cylindrical and has a circular cross section to fit into the hole 51. The hole 51 penetrating through the distal end portion 21 is closed by the other end 58. The other end 58 and the hole 51 may be fitted together by any of interference fit, clearance fit, and transition fit.

The ground electrode 53 is connected to the distal end portion 21 via the fused portion 59 in the hole 51. The bottom surface 60 of the ground electrode 53 is located substantially on the same plane as the counterbore 52. The fused portion 59 is formed by irradiating the bottom surface 60 of the ground electrode 53 disposed in the hole 51 with a laser beam. The fused portion 59 is a portion in which a portion including part of the bottom surface 60 of the ground electrode 53 and a portion including part of the counterbore 52 of the distal end portion 21 are fused together. In this embodiment, the intermittent fused portion 59 is provided along the edge of the bottom surface 60 of the ground electrode 53. The radially inner end of the fused portion 59 is not in contact with the inner circumference 30 of the distal end portion 21.

The heat of the ground electrode 53 is transferred to the distal end portion 21 through an interface 61 between the fused portion 59 and the distal end portion 21 and through a side surface 62 of a portion of the ground electrode 53 located inside the hole 51. As a result, the ground electrode 53 is cooled. The amount of heat transferred greatly depends on the areas of the interface 61 and the side surface 62. The fused portion 59 is a part of the ground electrode 53. The side surface 63 and the bottom surface 64 of a portion of the ground electrode 53 located inside the inner circumference 30 of the distal end portion 21 are heat-receiving surfaces that receive heat generated by combustion of the fuel.

The spark plug 50 is configured to have a value S/E of less than or equal to 13.1, where S/E is a value obtained by dividing a total surface area, S, of the side surface 63 and the bottom surface 64 of the ground electrode 53 located inside the inner circumference 30 of the distal end portion 21 by a side surface area, E, of the portion of the ground electrode 53 located inside the hole 51 (in this embodiment, the total area of the interface 61 and the side surface 62). This is to balance between the heat received by the ground electrode 53 and the heat transferred from the ground electrode 53 to the distal end portion 21 to prevent overheating of the ground electrode 53 and reduce the occurrence of pre-ignition.

Example

The present invention will be described in more detail by way of Example, but the present invention is not limited to the Example.

The examiner prepared parts, such as metal shells and ground electrodes, for producing spark plugs. The radial thicknesses of the distal end portions of the prepared metal shells were 0.3 mm to 1.8 mm, and the diameters of circular holes radially penetrating through the distal end portions were 0.8 mm to 2.5 mm. The examiner inserted the ground electrodes of various lengths, which have diameters to fit into the holes in the metal shells, into the holes, and irradiated the bottom surfaces of the ground electrodes with a laser beam to weld the entire circumferences of the bottom surfaces of the ground electrodes to the metal shells to produce samples Nos. 1-12 having the same shape as the spark plug according to the first embodiment.

Three-dimensional images were constructed from tomographic images of samples Nos. 1 to 12 obtained by using an X-ray CT scanner. Then, for each sample, a surface area S ($mm^2$) of a portion of the ground electrode located on the inner circumferential side of the distal end portion and a side surface area E ($mm^2$) of a portion of the ground electrode located inside the hole (i.e., the area of the interface of the fused portion) were obtained to calculate a value S/E, which is the surface area S divided by the side surface area E. The value S/E was a value obtained by dividing the surface area S by the side surface area E and rounding off the quotient to one decimal place. Samples Nos. 1 to 12 differed in the surface area S and the side surface area E, but were the same in other dimensions, such as the size of the spark gap, the size of the bottom surface of one end of the ground electrode, and material. Table 1 shows the surface areas S, the side surface areas E, and the values S/E of samples Nos. 1 to 12.

TABLE 1

| No. | Surface area S ($mm^2$) | Side surface area E ($mm^2$) | S/E (—) | Pre-ignition resistance | Wear resistance |
|---|---|---|---|---|---|
| 1 | 31.6 | 2.4 | 13.4 | D | A |
| 2 | 25.9 | 2.0 | 13.1 | C | A |
| 3 | 6.8 | 1.1 | 6.0 | B | A |
| 4 | 10.8 | 2.0 | 5.5 | A | A |
| 5 | 8.4 | 1.6 | 5.2 | A | A |
| 6 | 3.0 | 0.8 | 4.0 | A | A |
| 7 | 25.9 | 6.6 | 3.9 | A | A |
| 8 | 6.8 | 3.8 | 1.8 | A | A |
| 9 | 10.8 | 6.6 | 1.6 | A | A |
| 10 | 8.4 | 5.3 | 1.6 | A | A |
| 11 | 3.0 | 2.5 | 1.2 | A | A |
| 12 | 3.6 | 7.3 | 0.5 | A | D |

Pre-Ignition Test

The examiner measured the advance angles with respect to the ignition timing of a genuine spark plug of a test engine, in accordance with the method of pre-ignition test specified in Japanese Industrial Standard (JIS) D1606:2020. The larger the crank angle at which pre-ignition occurs is, the less likely it is for pre-ignition to occur. The samples with which pre-ignition occurred at an angle advanced by 7° or more with respect to the crank angle of the genuine spark plug were evaluated as A, the samples with which pre-ignition occurred at an angle advanced by 5° or more and less than 7° with respect to the crank angle of the genuine spark plug were evaluated as B, the samples with which pre-ignition occurred at an angle advanced by 2° or more and less than 5° with respect to the crank angle of the genuine spark plug were evaluated as C, and the samples with which pre-ignition occurred at an angle advanced by less than 2° with respect to the crank angle of the genuine spark plug were evaluated as D. The results are shown in the column of pre-ignition resistance in Table 1.

Bench Durability Test

The examiner examined the endurance distance with samples Nos. 1 to 12 in accordance with the method of bench durability test specified in JIS D1606:2020. The endurance distance is a distance corresponding to an increase of 0.2 mm in the spark gap between the center electrode and the ground electrode, as compared with that before the test. The samples with an endurance distance of 100,000 km or more were evaluated as A, and the samples with an endurance distance of 50,000 km or more and less than 100,000 km were evaluated as D. The results are shown in the column of wear resistance in Table 1.

As shown in Table 1, sample No. 1, in which the value S/E is more than 13.1, was evaluated as D in terms of pre-ignition resistance, whereas samples No. 2 to No. 12, in which the value S/E is less than or equal to 13.1, were evaluated as A to C in terms of pre-ignition resistance. This indicates that a spark plug in which the value S/E is 13.1 or less can reduce pre-ignition.

Sample No. 2, in which the value S/E is more than 6.0 and less than or equal to 13.1, was evaluated as C in terms of pre-ignition resistance, whereas samples No. 3 to No. 12, in which the value S/E is less than or equal to 6.0, were evaluated as A or B in terms of pre-ignition resistance. This indicates that a spark plug in which the value S/E is less than or equal to 6.0 can further reduce pre-ignition.

Sample No. 3, in which the value S/E is more than 5.5 and less than or equal to 6.0, was evaluated as B in terms of pre-ignition resistance, whereas samples No. 4 to No. 12, in which the value S/E is less than or equal to 5.5, were evaluated as A in terms of pre-ignition resistance. This indicates that a spark plug in which the value S/E is less than or equal to 5.5 can further reduce pre-ignition.

Sample No. 12, in which the value S/E is 0.5, was evaluated as A in terms of pre-ignition resistance, but was evaluated as D in terms of wear resistance. This is because, if the value S/E is 0.5 or less, the volume of the portion functioning as the ground electrode, between which and the center electrode discharge occurs, is small, and thus, the time until the portion stops functioning as the ground electrode is small. Thus, it is desirable that the value S/E be larger than 0.5, taking into consideration the wear resistance.

Although the present invention has been described on the basis of the embodiments, the present invention is not limited to these embodiments, and it can be easily inferred that various improvements and modifications can be made without departing from the spirit of the present invention.

In the embodiments, the cases where the hole 24, 51 is circular have been described, but the present invention is not necessarily limited thereto. Other examples of the shape of the hole 24, 51 include an ellipse, a semicircle, a polygon such as a triangle, a square, or a hexagon, and a polygon with rounded corners. The sectional shape of the ground electrode 25, 53 to be disposed in the hole 24, 51 is appropriately set so as to fit into the hole 24, 51, in accordance with the shape of the hole 24, 51.

In the first embodiment, the case where the continuous fused portion 37 is provided around the center line of the hole 24 has been described, and in the second embodiment, the case where the intermittent fused portion 59 is provided around the center line of the hole 51 has been described. However, the present invention is not necessarily limited thereto. It is of course possible to provide an intermittent fused portion 37 around the center line of the hole 24 in the first embodiment, and to provide a continuous fused portion 59 around the center line of the hole 51 in the second embodiment.

In the embodiments, the cases where the ground electrode 25, 53 is joined to the distal end portion 21 via the fused portion 37, 59 have been described, but the present invention is not necessarily limited thereto. It is of course possible to fix the ground electrode 25, 53 to the hole 24, 51 by fitting, instead of welding. The fitting between the hole 24, 51 and the ground electrode 25, 53 is interference fit or transition fit. In that case, there is no interface between the fused portion and the distal end portion, the side surface area E is the area of the side surface of the portion of the ground electrode 25, 53 located inside the hole 24, 51.

In the embodiments, the cases where a part of the bottom surface 38, 60 of the ground electrode 25, 53 remains unfused have been described, but the present invention is not necessarily limited thereto. The entire bottom surface 38, 60 of the ground electrode 25, 53 may be fused into the fused portion 37, 59 until there is no bottom surface 38, 60. Even when the entire bottom surface 38, 60 is fused into the fused portion 37, 59, the area of the interface 39, 61 between the fused portion 37, 59 and the distal end portion 21 is included in the side surface area 1.

In the first embodiment, the case where the size of the hole 24 is constant in the radial direction of the distal end portion 21 has been described. However, the present invention is not necessarily limited thereto. For example, it is of course possible to provide, in the distal end portion 21, a hole that decreases in size from the outer side toward the inner side in the radial direction of the distal end portion 21 (i.e., a tapered hole), and to dispose the ground electrode 25 in that hole.

In the embodiments, the cases where the hole 24, 51 is provided in the male thread 22 in the distal end portion 21 have been described. However, the present invention is not necessarily limited thereto. For example, it is of course possible to provide the distal end portion 21 with a tubular portion having no male thread 22, make a hole in the tubular portion, and provide the ground electrode 25, 53 therein.

In the embodiments, the cases where the hole 24, 51 penetrates through the distal end portion 21 have been described. However, the present invention is not necessarily limited thereto. This is because, even if the hole does not penetrate through the distal end portion 21, the other end 33, 58 of the ground electrode 25, 53 can be disposed in the hole as long as a part of the inner circumference 30 of the distal end portion 21 is recessed.

In the embodiments, the cases where the other end 33, 58 of the ground electrode 25, 53 has substantially the same diameter as the one end 32, 57 of the ground electrode 25, 53 have been described. However, the present invention is not necessarily limited thereto. The one end 32, 57 and the other end 33, 58 of the ground electrode 25, 53 may of course have different diameters.

In the embodiments, the cases where the one end 32, 57 and the other end 33, 58 of the ground electrode 25, 53 have the same sectional shape have been described. However, the present invention is not necessarily limited thereto. The one end 32, 57 and the other end 33, 58 may of course have different sectional shapes.

In the embodiments, the cases where the spark gap is provided between the side surface of the center electrode 15 and the one end 32, 57 of the ground electrode 25, 53 have been described. However, the present invention is not necessarily limited thereto. The spark gap may be provided between the distal end of the center electrode 15 and the side surface of the ground electrode 25, 53 by shifting the position of the hole 24, 51 provided in the distal end portion 21 toward the distal side, and slightly increasing the length of the ground electrode 25, 53.

In the embodiment, the case where the cap 26 is disposed at the distal end of the distal end portion 21 of the metal shell 20 has been described. However, the present invention is not necessarily limited thereto. The cap 26 may of course be omitted. This is because, even without the cap 26, if the one end 32, 57 of the ground electrode 25, 53 is surrounded by the distal end portion 21 of the metal shell 20, cooling by fuel or intake charge mixture is insufficient, compared with a spark plug in which the ground electrode is provided outside the metal shell.

In the embodiment, the case where the hemispherical cap 26 is disposed on the metal shell 20 has been described. However, the present invention is not necessarily limited thereto. The shape of the cap 26 may be set as appropriate. Other examples of the shape of the cap 26 include a bottomed cylindrical shape and a disk shape.

In the embodiment, the case where the cap 26 is welded to the metal shell 20 has been described. However, the present invention is not necessarily limited thereto. It is of course possible to prepare a tubular member having a cap at the distal end thereof and connect the tubular member to the metal shell 20 to form the space 29. The tubular member is closed by the cap at the distal end thereof and has, in the inner circumferential surface thereof, a female thread to be mated with the male thread 22 on the metal shell 20. The outer circumferential surface of the tubular member is provided with a male thread to be mated with a female thread in the plug hole of the engine. By mating the female thread in the tubular member with the male thread 22 on the metal shell 20, the cap is disposed at the distal end of the metal shell 20. The cap has the through holes 27.

The means for connecting the tubular member to the metal shell 20 to dispose the cap at the distal end of the metal shell 20 is not limited to the means in which the female thread in the inner circumferential surface of the tubular member is mated with the male thread 22 on the metal shell 20. The tubular member may of course be connected to the metal shell by other means. Examples of the other means include joining the tubular member and the metal shell by welding or the like. The tubular member is made of, for example, a metal material, such as a Ni-based alloy or stainless steel, or ceramics, such as silicon nitride.

DESCRIPTION OF REFERENCE NUMERALS

10, 50 spark plug
15 center electrode
20 metal shell
21 distal end portion
24, 51 hole
25, 53 ground electrode
32, 57 one end
33, 58 the other end

What is claimed is:

1. A spark plug comprising:

a center electrode;

a metal shell that holds the center electrode in an insulated manner; and a rod-like ground electrode electrically connected to the metal shell and having one end opposed to the center electrode, the metal shell including a tubular distal end portion inside which the one end of the ground electrode is located, the distal end portion having a hole into which the other end of the ground electrode is inserted, wherein a value obtained by dividing a surface area of a portion of the ground electrode, the portion being located on an inner circumferential side of the distal end portion, by a side surface area of a portion of the ground electrode, the portion being located inside the hole, is less than or equal to 13.1.

2. The spark plug according to claim 1, wherein the value is less than or equal to 6.0.

3. The spark plug according to claim 1, wherein the value is less than or equal to 5.5.

* * * * *